June 29, 1948. P. DZURNAK ET AL 2,444,286
PROTECTIVE COVERING FOR FRAME MOLDINGS
Filed July 17, 1947

INVENTORS.
PAUL DZURNAK, &
BY EMIL W. DZURNAK.
Brown, Critchlow, Flick & Peckham
their
ATTORNEYS.

Patented June 29, 1948

2,444,286

UNITED STATES PATENT OFFICE 2,444,286

PROTECTIVE COVERING FOR FRAME MOLDING

Paul Dzurnak and Emil W. Dzurnak, Oliver, Pa.

Application July 17, 1947, Serial No. 761,492

4 Claims. (Cl. 20—92)

This invention relates to window frame construction and the like, and, in particular, to protecting the mitred corners of the frame molding.

It is common in window construction, or the like, to nail a molding onto the window frame and, usually, this molding has mitred corners and is rabbeted so as to fit around shingles or insulating brick which lie adjacent the frame. In most frame houses, and some others, the windows are not inset so that the moldings are subject to weather conditions and alternating rains and sunlight soon cause them to warp and the mitred corners to separate. As a result, more moisture can seep through the cracks at the corners and into other parts of the window construction which then become rotted and weak and also become an attraction for termites and other household pests.

It is therefore an object of this invention to provide a protective covering for the mitred corners which will keep out moisture and prevent the corners from separating.

Figure 1:
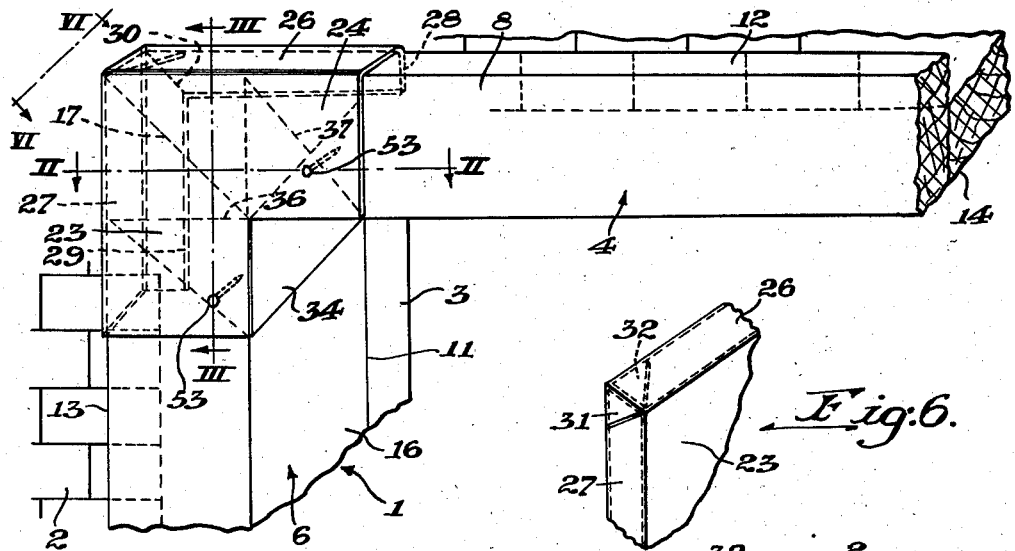
Figure 2:
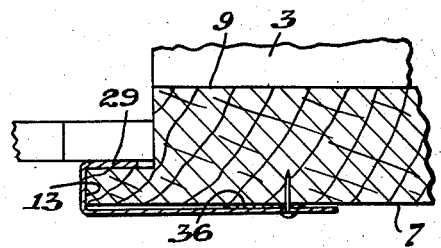
Figure 3:
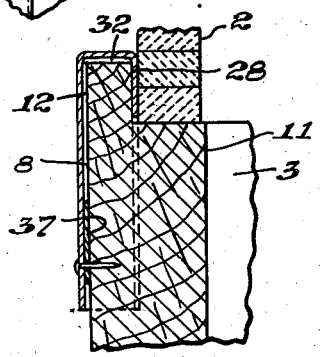
Figure 4:
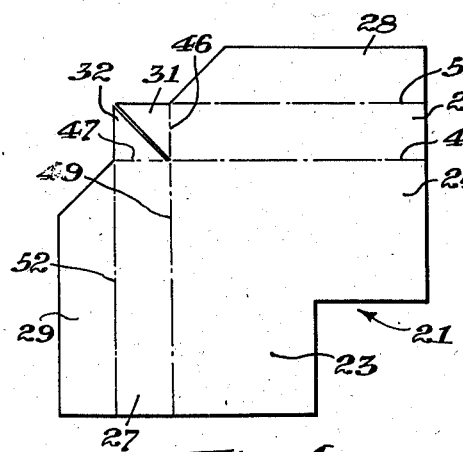
Figure 5:
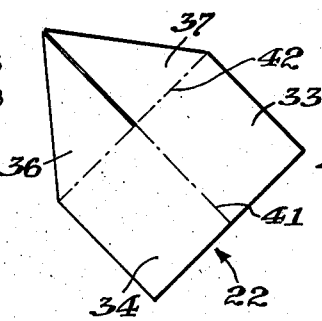

The preferred embodiment of the invention is illustrated in the accompanying drawings, of which Fig. 1 is a perspective view of a window corner construction with the covering positioned on the molding; Figs. 2 and 3 are sections along lines II—II and III—III, respectively, of Fig. 1; Figs. 4 and 5 are plan views of the blanks from which the corner covering is formed; and Fig. 6 is a fragmentary perspective view of the corner looking in the direction of arrows VI—VI, Fig. 1.

Referring to the drawings, the corner construction includes a window frame molding 1 which is rabbeted to receive shingles or insulating brick 2 and which is attached to a window frame 3 by tacks or the like. The molding is made up of two fitted pieces 4 and 6 the surfaces of which, for purposes of description, will be designated as front faces 7 and 8, rear faces 9 and 11, outer top and side faces 12 and 13 and inner top and side faces 14 and 16. The two pieces 4 and 6 have their meeting ends beveled in the usual manner so as to form a mitred corner joint indicated by the dotted line 17 of Fig. 1.

The protective covering provided by this invention preferably consists of two parts formed from blanks 21 and 22 which are shown in plan in Figs. 4 and 5, respectively, although, if desired, the additional protection of part 22 may be sacrificed and part 21 used alone. The description of the covering will be with reference to the bent and attached form shown in Figs. 1, 2 and 3 and its flat surfaces will be designated in a manner similar to the designations of the surfaces or faces of the molding which they protect.

Figure 6:
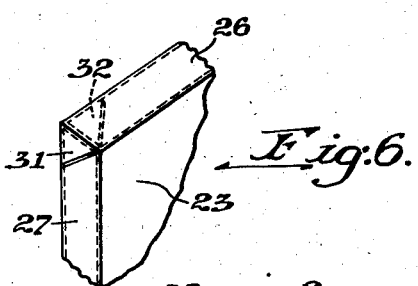

As shown, part 21 of the covering includes front walls 23 and 24, top wall 26 and side wall 27, the rear marginal edge of the top and side walls being bent inwardly at right angles to form flanges 28 and 29, and the upper edges of the top and side walls also being bent downwardly at right angles and being formed into right angle triangular flanges or wings 31 and 32, of which, as shown in Fig. 6, flange 31 overlaps side wall 27 and flange 32 fits along the inner surface of top wall 26. Further, as is shown in Figs. 1 and 4, the upper edges of inwardly bent flanges 28 and 29 are cut away at such an angle that these edges meet in a line 30 which is inclined to the same degree as the mitre of the corner. The other part 22 of the covering is adapted to protect the inner corner of the molding and is formed of inner top and side wall 33 and 34, and a pair of right angle triangular flanges 36 and 37.

The covering as a whole and the protection which it affords the corner can be more readily appreciated by a brief description of the manner in which the blanks of Figs. 4 and 5 are bent as well as the way that the parts fit over the corner and are secured together. Referring to Figs. 4 and 5, these parts, which can be stamped very inexpensively from a thin, non-corrosive metal sheet such as copper or aluminum, are each bent along the dot and dash lines indicated therein. Part 22, Fig. 5, is simply formed by bending its top wall 33 along the line 41 at right angles to the side wall 34 and then bending its right angle triangular flanges 36 and 37 inwardly along line 42 at right angles to the top and side walls. Part 22 then can be fitted about the inner corner of the molding as shown in Fig. 1 and secured by flat headed wire brads or the like.

Part 21 is formed by first bending its triangular flanges or wings 31 and 32 downwardly along lines 46 and 47 at right angles to the top and side walls, respectively, and then top wall 26 can be bent downwardly along line 48 at right angles to front wall 24, and side wall 27 inwardly along line 49 at right angles to front wall 23. The forming of part 21 then is completed by bending its beveled flanges 28 and 29 inwardly at right angles along lines 51 and 52 and the unit is ready to be fitted over the mitred corner.

When the covering is fitted over the corner, it will be seen that the top and side walls of part 21 cover the top and side faces of the molding and the front walls cover the front faces of the molding as well as triangular flanges 36 and 37 of part 22, the two parts being secured together by small headed nails 53. Flanges 28 and 29, which are bent downwardly and inwardly, respectively, fit between the rear surfaces of the molding and the window frame, or, if the molding is rabbeted as shown in the drawings, they fit between the molding and insulating brick 2. The covering is watertight since, as has been explained and is illustrated in Fig. 6, triangular flange 31, of part 21, overlaps side wall 27 and flange 32 fits under top wall 26.

It will be appreciated that the covering is extremely simple and can be inexpensively manufactured and easily placed on moldings, either before or after the molding is tacked to the window frame. In practice after the protected molding is attached, the edges around it are further protected by a caulking compound, although if the work has been performed properly, such extra precaution may be unnecessary.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

1. A protective covering for a mitred corner of a frame molding comprising front, top and side walls for covering the front, top and side faces of said corner, a downwardly extending flange formed along the rear edge of said top wall and an inwardly extending flange formed along the rear edge of said side wall, said flanges respectively fitting around the rear marginal edges of said corner top and side faces, and triangular flanges formed at the meeting edges of said top and side walls, said triangular flanges of each wall extending along the other wall in contact with it, and one of said flanges overlapping said other wall to form a weather seal.

2. A protective covering for a mitred corner of a frame molding comprising front, top and side walls for covering the front, top and side faces of said corner, a downwardly extending flange formed along the rear edge of said top wall and an inwardly extending flange formed along the rear edge of said side wall, said flanges respectively fitting around the rear marginal edges of said corner top and side faces and also meeting each other in an angular line coincident with the angle of said mitre, and triangular flanges formed at the meeting edges of said top and side walls, said triangular flanges of each wall extending along the other wall in contact with it and one of said flanges overlapping said other wall to form a weather seal.

3. A two-part protective covering for a mitred corner of a frame molding, the first part comprising front, top and side walls for covering the front, top and side faces of said corner, a downwardly extending flange formed along the rear edge of said top wall and an inwardly extending flange formed along the rear edge of said side wall, said flanges respectively fitting around the rear marginal edges of said corner top and side faces, and triangular flanges formed at the meeting edges of said top and side walls, said triangular flanges of each wall extending along the other wall in contact with it, and one of said flanges overlapping said other wall to form a weather seal; and the second of said parts comprising top and side walls for covering the inner top and side faces of said corner, and triangular flanges formed at the front edges of said top and side wall, said front flanges fitting under said front walls of the first part of said covering.

4. A two-part protective covering for a mitred corner of a frame molding, the first part comprising front, top and side walls for covering the front, top and side faces of said corner, a downwardly extending flange formed along the rear edge of said top wall and an inwardly extending flange formed along the rear edge of said side wall, said flanges respectively fitting around the rear marginal edges of said corner top and side faces, and also meeting each other in an angular line coincident with the angle of said mitre, and triangular flanges formed at the meeting edges of said top and side walls, said triangular flanges of each wall extending along the other wall in contact with it, and one of said flanges overlapping said other wall to form a weather seal; and the second of said parts comprising top and side walls for covering the inner top and side faces of said corner, and triangular flanges formed at the front edges of said top and side wall, said front flanges fitting under said front walls of the first part of said covering.

PAUL DZURNAK.
EMIL W. DZURNAK.

REFERENCES CITED

The following references are of record in the file of this patent:

UNITED STATES PATENTS

| Number | Name | Date |
| --- | --- | --- |
| 1,758,955 | Lovejoy | May 20, 1930 |
| 2,192,545 | Fredman | Mar. 5, 1940 |